United States Patent [19]

Neal, Jr. et al.

[11] 4,386,855
[45] Jun. 7, 1983

[54] HIGH PRESSURE MECHANICAL MIXER FOR EPOXY COMPOUNDS

[75] Inventors: Jesse R. Neal, Jr., Panama City, Fla.; Truman W. Humphries, Napa, Calif.

[73] Assignee: The United States of America as represented by the Secretary of the Navy, Washington, D.C.

[21] Appl. No.: 277,368

[22] Filed: Jun. 25, 1981

[51] Int. Cl.³ .............................................. B01F 7/12
[52] U.S. Cl. .................................. 366/177; 366/305; 366/340
[58] Field of Search ............... 366/176, 177, 184, 194, 366/293, 294, 295, 296, 302, 305, 306, 307, 336, 340

[56] References Cited

U.S. PATENT DOCUMENTS

| | | | |
|---|---|---|---|
| 2,645,463 | 7/1953 | Stearns | 366/340 X |
| 2,995,346 | 8/1961 | Samples | 366/304 X |
| 3,214,144 | 10/1965 | Gugel et al. | 366/177 |
| 3,220,703 | 11/1965 | Deuschel | 366/293 |
| 3,729,178 | 4/1973 | Stade | 366/324 X |
| 3,751,015 | 8/1973 | Hensen et al. | 366/81 |
| 3,776,529 | 12/1973 | Sutter et al. | 366/78 |
| 3,924,836 | 12/1975 | Bruning et al. | 366/279 X |
| 4,007,922 | 2/1977 | Tamura | 366/81 |
| 4,043,539 | 8/1977 | Gilmer et al. | 366/340 |

*Primary Examiner*—Philip R. Coe
*Attorney, Agent, or Firm*—R. S. Sciascia; Charles D. B. Curry; William C. Daubenspeck

[57] ABSTRACT

Apparatus for mixing viscous, curable liquid materials in which the components to be mixed are fed at high pressure (up to 5000 psi) into the central longitudinal chamber of a mixing head. The inlet ducts are on opposing sides of the chamber and displaced longitudinally so that there is no mixing of the components in the upstream end of the chamber where the drive shaft enters the mixing head. The two components are forced from the chamber through rotating apertures into a rotating inner tube (rotating at up to 500 RPM). The end of the rotating inner tube is closed so that the high pressure forces the material through a multiplicity of apertures in the wall of the tube. The rotating tube is enclosed in a concentric stationary tube having a multiplicity of apertures in its walls. The material is forced through the second group of apertures into an annular outer chamber which leads to the output of the mixer. A final stage of mixing may be provided by forcing the mixture through a set of apertures and around some baffles to exit into an outlet duct through a plurality of apertures.

7 Claims, 4 Drawing Figures

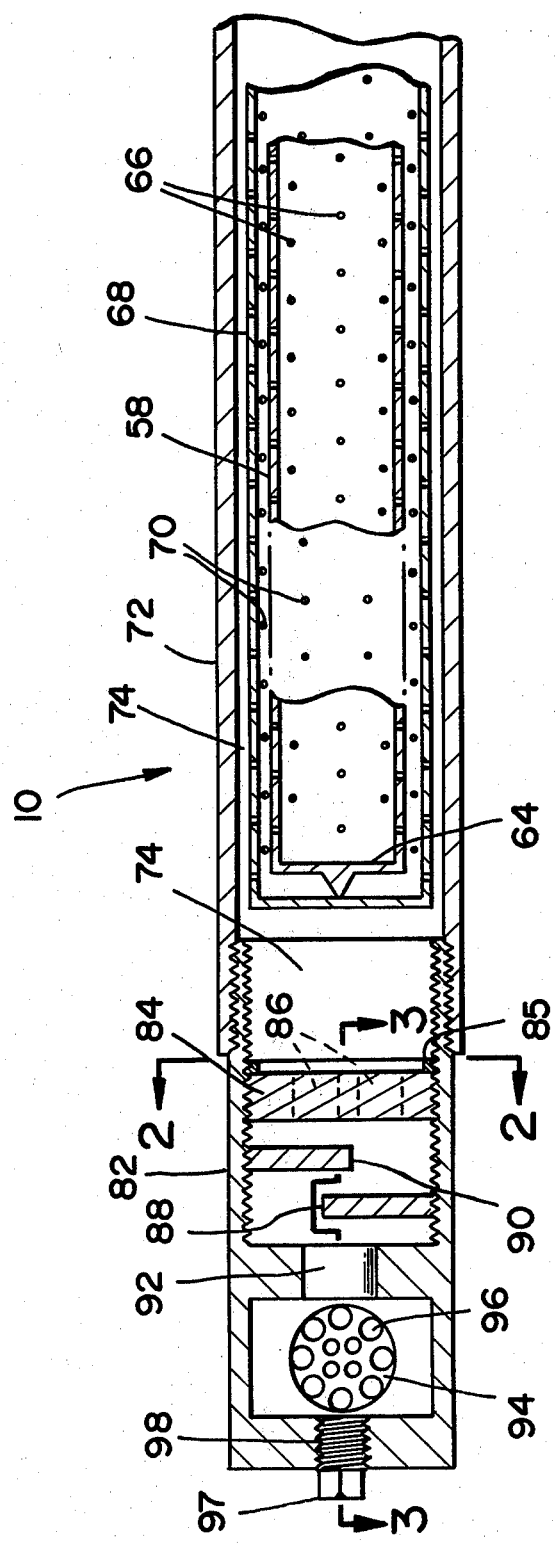
FIG_1A

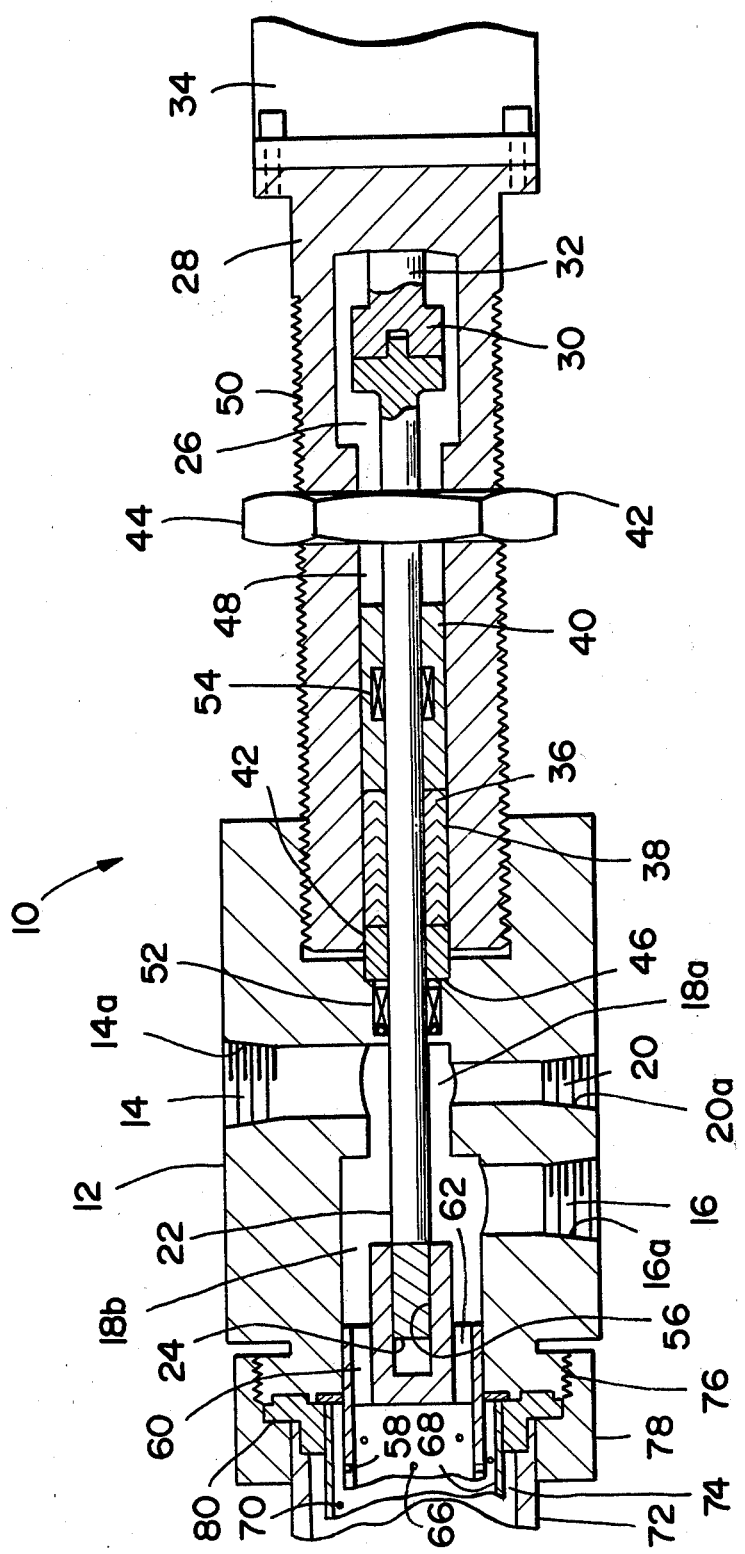
FIG_1B

HIGH PRESSURE MECHANICAL MIXER FOR EPOXY COMPOUNDS

BACKGROUND OF THE INVENTION

1. Field of the Invention

The present invention relates generally to mixing devices and, more particularly, to apparatus for mixing viscous liquid components for forming a curable liquid material. The present invention relates especially to apparatus for mixing polyamide resins and epoxy resins to form curable epoxy-polyamide compounds.

2. Description of Prior Art

The mixing of polyamide resins and epoxy resins to form curable epoxy polyamide compounds has presented difficulties with prior mixing apparatus. The high viscosities of the components have made it difficult to both thoroughly mix the components and achieve a steady uniform flow of the material through the mixer. The prior art mixers have required excessive time to achieve thorough mixing and often have areas of lesser agitation and internal recycling. These limitations are particularly serious when the mixture is a curable compound which must be thoroughly and uniformly mixed and has a limited pot life. In addition prior art mixers have experienced problems with curable mixtures hardening within the mixer to block passage or to seal the mixer shaft, thus necessitating time-consuming repairs.

SUMMARY OF THE INVENTION

It is therefore an object of the present invention to provide improved apparatus for mixing viscous materials and, in particular, for mixing curable viscous components.

Another object is to provide mixing apparatus which achieves both thorough mixing and steady uniform flow rates with viscous materials.

Another object is to provide mixing apparatus which minimizes maintenance problems associated with the mixing of curable materials.

These and other objects are accomplished in a mechanical (rotary) mixer in which the components to be mixed are fed at high pressure (up to 5000 psi) into inlet ducts on opposing sides of a mixing head. The inlet ducts are displaced longitudinally so that there is no mixing of the components at the upstream end of a central longitudinal chamber where the mixer shaft enters the mixing head. A V-ring packing arrangement is provided to seal the mixing head around the mixer shaft because of the high pressures. The two components are forced by the high pressure through rotating passages into a rotating mixing tube (rotating at up to 500 RPM). The end of the rotating tube is enclosed so that the high pressure forces the material through a multiplicity of apertures in the wall of the rotating tube. The rotating tube is surrounded by a concentric stationary tube having closed ends and a multiplicity of apertures in its walls. The material is forced through the second group of apertures into an annular outer chamber which leads to the output of the mixer. A final stage of mixing may be provided by forcing the mixture through a set of apertures and around some baffles to exit into an outlet duct through a plurality of apertures.

BRIEF DESCRIPTION OF THE DRAWING

FIGS. 1A and 1B combined provide a vertical cross-sectional view of the preferred embodiment.

FIG. 2 is a vertical cross-sectional view taken along line 2-2' in FIG. 1a.

FIG. 3 is a horizontal cross-sectional view taken along line 3-3' in FIG. 1a.

DESCRIPTION OF THE PREFERRED EMBODIMENT

Figure 3:
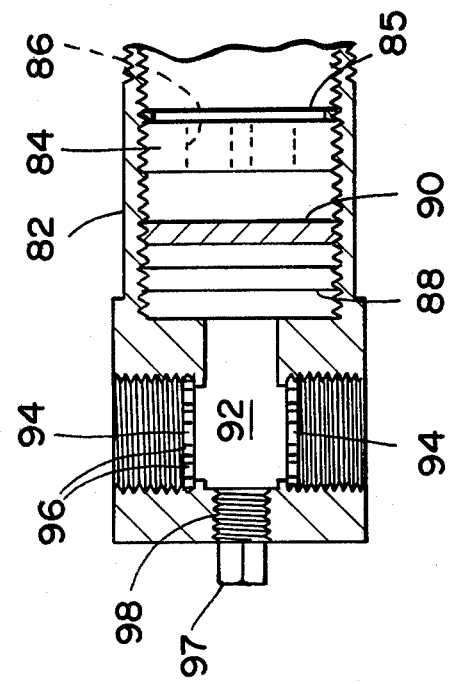

Referring now to the drawing, wherein like reference characters identify like parts in the several views and in particular to FIGS. 1a and 1b, the mechanical mixer 10 includes a mixing head 12 having a first inlet duct 14 and a second inlet duct 16. The inlet ducts lead to a central cylindrical chamber having a first section 18a into which duct 14 leads and a second section 18b of a somewhat larger diameter into which the second duct 16 leads. The inlet ducts 14 and 16 have first sections 14a and 16a which are threaded for providing a secure connection to inlet couplings (not shown). A third, smaller inlet duct 20 into the first cylindrical section 18a is provided for supplying solvent to the interior of the mixing head 12. The solvent inlet duct 20 also has a threaded section 20a for providing a secure connection under high pressure. The overall flow of the materials to be mixed is longitudinally through the cylindrical chamber 18 from the first section 18a through the second section 18b. Accordingly, the terms downstream and upstream will be used hereinafter to designate the positions of various structures relative to each other or to the flow of the materials.

A cylindrical drive shaft 22 having a squared end portion 24 extends longitudinally through the center of the chamber 18 to adjacent the downstream end of section 18b. In the other longitudinal direction, the drive shaft 22 extends out of the mixing head 12 and through a central chamber 26 in a cylindrical stuffing box 28 where it is joined by a suitable coupling 30 to the shaft 32 of a variable-speed air motor 34.

The stuffing box 28 which is threadably coupled to the mixing head 12 houses V-ring packing 36 which seals the upstream end of the mixing head 12 to prevent the high pressures involved from forcing the mixing materials out of the mixing chamber 18. The annular rings of the V-ring packing 36 are disposed between the inside wall of the stuffing box 28 and the drive shaft 22. A T-shaped adaptor 40 an annular adaptor 42, and a packing nut 44 are provided for applying pressure to the packing 36. The annular adaptor 42 is disposed around the drive shaft 22 and abuts an annular edge 46 of the mixing head 12. The crossbar 48 of the T-shape adaptor 40 extends across the chamber 26 (i.e., out of and into the plane of FIG. 1) so that the packing nut 44 may be tightened (on external threads 50 of the stuffing box 28) against the T-shaped adaptor 40. The packing nut 44 may be tightened to compress the V-ring packing 36 between the annular adaptor 42 and the T-shaped adaptor 40. The packing rings 36 may thus be periodically expanded as their edges become worn due to the high speed rotation of the drive shaft 22, thereby maintaining the high pressure seal.

Nylined bearings 52 and 54 are disposed in the annular grooves in the mixing head 12 and the T-shaped adaptor 40, respectively.

The squared end of the drive shaft 22 is mated with a squared receptacle 56 fixed to the upstream end of an inner mixing tube 58 so that the inner mixing tube rotates with the drive shaft. The inner mixing tube 58 has two inlet apertures 60 and 62 which allow communication between the interior of the inner tube and the chamber 18 of the mixing head 12. The downstream end 64 of the inner tube 58 is enclosed so that material pumped into the tube through inlets 60 and 62 is forced to exit through a multiplicity of small apertures 66 in the tube wall into a second mixing tube 68, concentric with the first tube 58.

The second mixing tube 68 which is stationary is enclosed at both the upstream and downstream ends and has a plurality of apertures 70 in its side walls. The second mixing tube 68 is surrounded by a concentric outer sleeve 72, forming a chamber 74 around the second tube 68 and extending downstream therefrom.

The outer sleeve 72 is threadably coupled to the second mixing tube 68 at 76 at their upstream ends. The sleeve 72 and second tube 68 are then jointly coupled to the mixing head 12 by a union nut 78 which abuts a flange 80 on the second mixing tube 68. The union nut 78 also secures the second mixing tube 68 against the inner mixing tube 58 to fix the inner mixing tube in position against the mixing head 12.

Figure 2:
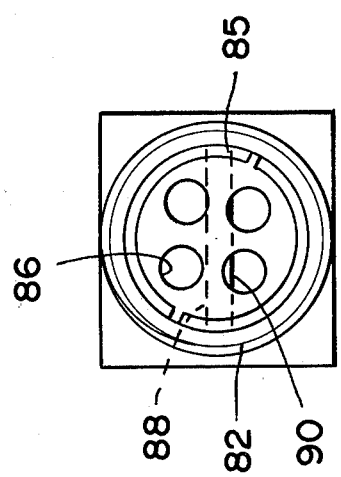

The downstream end of the outer sleeve 72 is threadably coupled to an output member 82 within which a limited additional mixing occurs. With reference to FIGS. 2 and 3 as well as FIG. 1a, the output member 82 includes a disk 84 having a plurality of apertures 86 which communicate with the chamber 74. Downstream from the disk 84, which is threaded into the output member 82 and held in place by lock ring 85, a pair of semicircular baffles 88 and 90 are disposed to provide a winding path for the material. After the baffles 88 and 90, the walls of output member 82 converge to an output member having two output ducts 92 either of which may be plugged if desired. Each output duct 92 holds a disk 94 having a plurality of apertures 96. An aperture 98 is provided in the end of the output member 82 to allow a cleaning solvent to be pumped into the apparatus. During normal operation a fitting 97 is employed to seal the solvent aperture 98.

In operation, a first component such as polyamide resin and a second component such as epoxy resin are pumped in the proper proportions and under high pressure, up to 5000 psi, into the mixing head 12 via inlet ducts 14 and 16. Actual operation has shown that the component which is pumped into the downstream chamber 18b through duct 16 does not flow into the upstream chamber 18a where it might contact the other component and begin the curing process. Thus the upper chamber 18a contains only a single component (that pumped into duct 14) and, accordingly, no curable mixture can pass into the region of bearings 52 or the V-ring packing 38 to harden and block the mixing apparatus.

The V-ring packing 38 surrounding the drive shaft 22 provides a high pressure seal to prevent material in the upper section of the chamber 18a from being forced out of the mixing head 12 along the mixer shaft in the area where the shaft enters the mixing head. As the rotation of the shaft 22 wears away the inside edge of the V-rings, the packing nut 44 may be tightened to flatten the V-ring which maintains the high pressure seal.

Thus the two components are forced under high pressure into the downstream section 18b of the chamber and into the inner mixing tube 58 through the two inlet apertures 60 and 62. Both the tube 58 and the apertures 60 and 62 are rotated at a speed up to approximately 500 RPM. The rotation of the inlet apertures 60 and 62 continuously shears off portions of the materials in the lower section 18b and redistributes the material in the inner mixing tube 58 as it is forced under the high pressure from the chamber 18 into the rotating inlet apertures. The material then undergoes a second stage of mixing as it is forced by the high pressure through the apertures 66 in the rotating inner tube 58 into the space between the inner tube and the stationary second mixing tube 68. The material, which has been thoroughly mixed at this point, undergoes additional mixing as it is forced through the apertures 70 in the second tube 68 into the outer chamber 74.

In general, the material in the outer chamber 74 is very thoroughly mixed and is suitable for use. However, in the preferred embodiment, a limited degree of additional mixing is provided as the material in the outer chamber 74 is forced through the apertures 86 in the disk 84, and flows around the semicircular baffles 88 and 90 into the output ducts 92. The mixture then exits the mixer through the apertures 96 in the disks 94 disposed in the output ducts 92.

Obviously many modifications and variations of the present invention are possible in light of the above teachings. It is therefore to be understood that within the scope of the appended claims the invention may be practiced otherwise than as specifically described.

What is claimed is:

1. Apparatus for mixing viscous, curable liquid materials, which comprises:
   (a) a mixing head having a central, longitudinal chamber and having inlet ducts for introducing components for forming a curable liquid material into said central longitudinal chamber, said components being introduced under high pressure;
   (b) a drive shaft extending longitudinally through said longitudinal chamber of said mixing head;
   (c) a rotary drive means coupled to one end of said drive shaft for rotating said drive shaft;
   (d) an inner mixing tube having an enclosed downstream end and having a multiplicity of apertures in its side wall, said inner mixing tube having a pair of inlet apertures in its upstream end communicating with the central chamber of said mixing head, said inner tube being coupled to said drive shaft for rotation therewith;
   (e) a second mixing tube concentric with and surrounding said inner mixing tube, said second mixing tube having a multiplicity of apertures in its side wall, the ends of said second mixing tube being enclosed so that an annular chamber is formed between the wall of said inner mixing tube and the wall of said second mixing tube;
   (f) an outer sleeve concentric with and surrounding said second mixing tube, the upstream end of said outer sleeve being closed so that a second annular chamber is formed between the outer sleeve and the wall of the second mixing tube; and
   (g) an outlet means communicating with said second annular chamber for discharging the resultant mixture.

2. Apparatus as recited in claim 1 wherein said mixing head has a first inlet duct for introducing a first component into the upstream end of said central longitudinal chamber and a second inlet duct for introducing a second component into said central longitudinal chamber downstream of said first inlet duct so that no mixing of the components occurs in the upstream end of said central longitudinal chamber.

3. Apparatus as recited in claim 2 wherein said first inlet duct and said second inlet duct are on opposite sides of said longitudinal chamber.

4. Apparatus as recited in claim 1 wherein the longitudinal chamber in said mixing head has an upstream section into which a first inlet leads and a downstream section into which the second inlet duct leads, the downstream section having a larger cross-sectional area than the upstream section.

5. Apparatus as recited in claim 4 wherein said first inlet duct and said second inlet duct are on opposite sides of said longitudinal chamber.

6. Apparatus as recited in claim 1, 2, 3, 4 or 5 wherein said mixing head has an additional inlet duct leading into the upstream end of said longitudinal chamber for introducing solvent into said chamber.

7. Apparatus as recited in claim 1 wherein said outlet means includes:
(a) a cylindrical chamber communicating with said second annular chamber;
(b) a first disk disposed in said cylindrical chamber normal to the direction of material flow, said first disk having a plurality of apertures through which said material flows;
(c) a pair of semicircular baffles disposed in said cylindrical chamber downstream from said disk;
(d) an output duct communicating with the downstream end of said cylindrical chamber; and
(e) a second disk disposed in said output duct normal to the direction of material flow, said second disk having a plurality of apertures through which said material flows.

* * * * *